March 11, 1958    K. B. BREDTSCHNEIDER    2,826,391
WEDGE VALVE
Filed Oct. 20, 1951      2 Sheets-Sheet 1
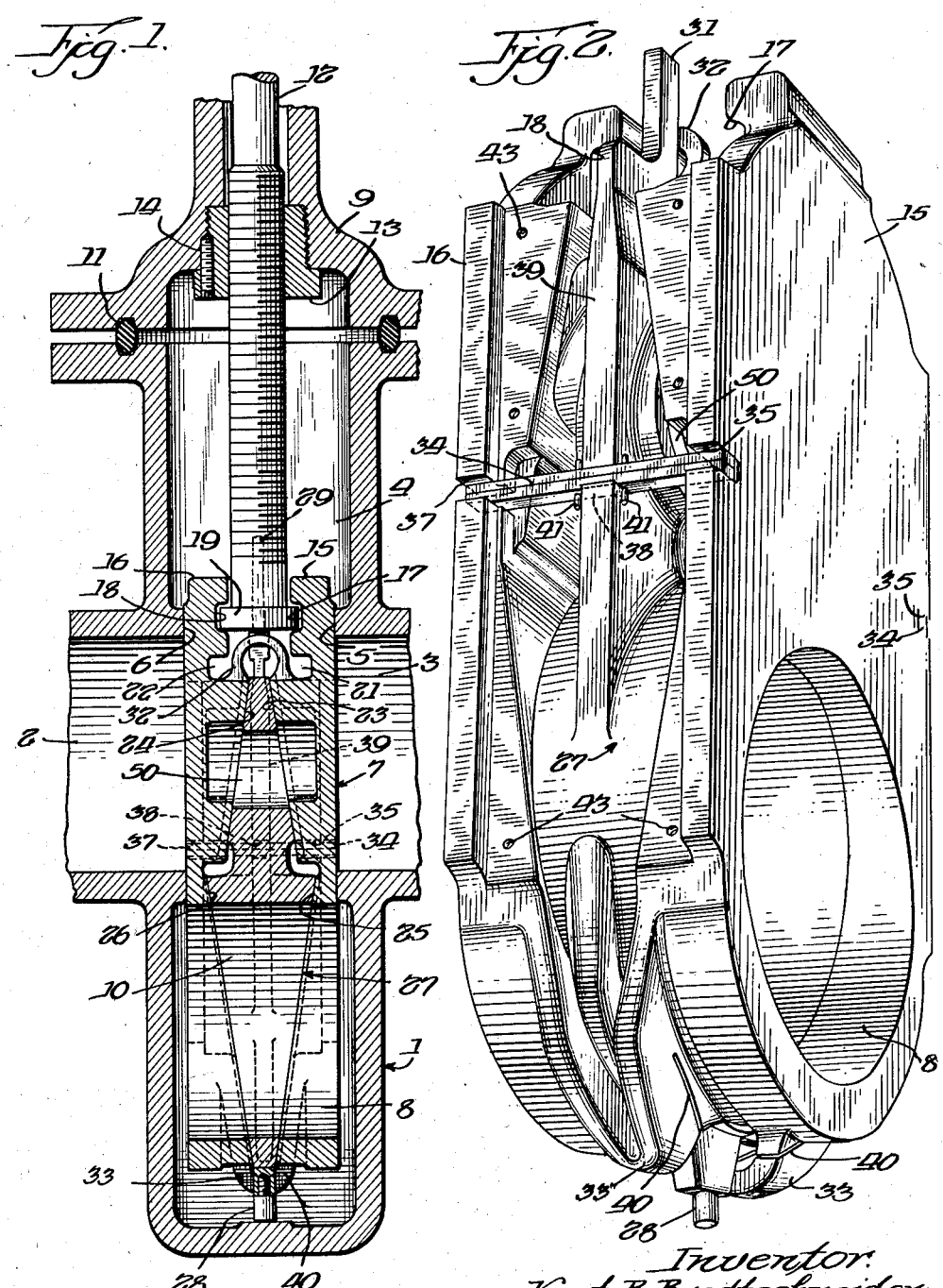

March 11, 1958    K. B. BREDTSCHNEIDER    2,826,391
WEDGE VALVE
Filed Oct. 20, 1951            2 Sheets-Sheet 2
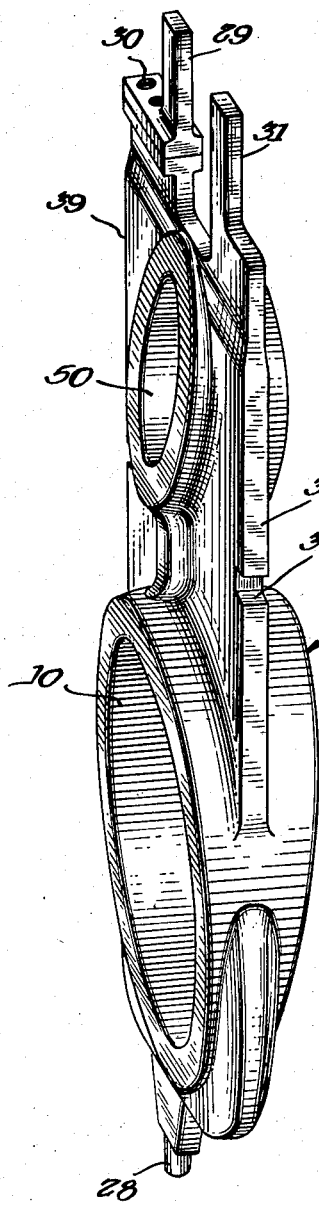
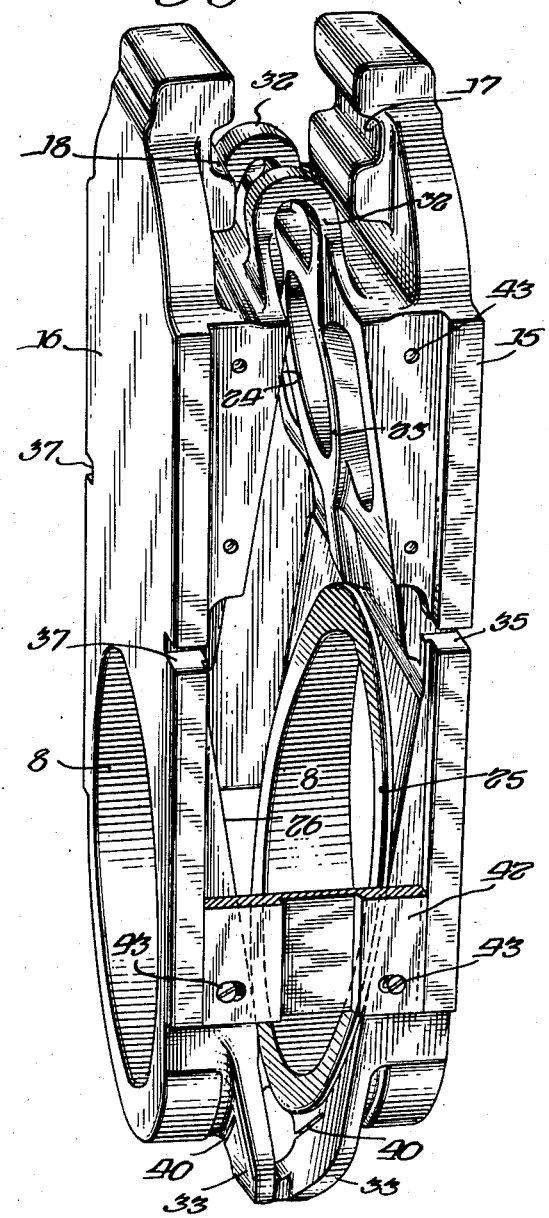
Inventor:
Kurt B. Bredtschneider
By Joseph O. Lange
Atty.

United States Patent Office 2,826,391
Patented Mar. 11, 1958

2,826,391

WEDGE VALVE

Kurt B. Bredtschneider, Chicago, Ill., assignor to Crane Co., Chicago, Ill., a corporation of Illinois Application October 20, 1951, Serial No. 252,322

6 Claims. (Cl. 251—167)

This invention relates generally to gate valves, and, more particularly, to a valve of the form of construction of a webbed or single unit disc respectively for conduit type, parallel and tapered seat gate or frusto-conical valves and the like with either inner, double, or single-acting spreading or wedging devices.

In obtaining a true appreciation of this contribution, it should be understood at the outset that heretofore in valves employing either inner, double, or single-acting spreading means for gate valves and the like, it has been the practice to make the disc halves in separate units, thus incurring substantial expenses in actual machining, making assemblies, and the general maintenance handling for production purposes. It should be further understood that in connection with wedging mechanisms employed in such gate or frusto-conical valves, the actual wedging movement required is of an extremely small order. It is thus unnecessary to contemplate any substantial movements therebetween during the course of wedging the closure member in seating it, and it is this condition which enables the instant discovery to be practical and more economical in many ways.

Thus, an important object is to provide for gate closure members joined preferably at an upper and lower end thereof by thin webs permitting slight relative movement therebetween when wedging takes place in closing and seating the valve.

Another important object of the invention is to provide for a type of valve construction in which more exact or precise machining is not required, which was not true of the previous types in which independent closure members or discs were employed.

Another object is to provide for a structure in which there is only a single depending element cooperating with the spindle or stem, and, therefore, it lends itself to more uniform wedging and easier assembling or disassembling of the valve insert.

Further, in this construction, there is also an avoidance in the use of a loose plate on the inlet side which normally causes rattling and vibration in the pipeline during the course of operating the valve.

Another object of the invention is to provide for a type of valve in which the sleeve disc insofar as the wedging action is concerned decreases the friction on the outlet side of disc or closure member during the course of opening or closing of the valve.

Other objects and advantages will become more readily apparent upon proceeding with the following description read in light of the accompanying drawings, in which:

Fig. 1 is a fragmentary sectional assembly view of a conduit valve employing my invention.

Fig. 2 is a perspective exterior view of one form of the specific unit shown in Fig. 1.

Fig. 3 is an exterior perspective view of the novel wedging mechanism per se, and as employed in a conduit valve of the type shown in Fig. 1.

Fig. 4 is a perspective view of the assembled disc referred to in the foregoing figures, out with the wedging device of Fig. 3 removed.

Referring now to Fig. 1, the conduit type of valve body or casing is shown generally designated 1 having the usual inlet and outlet ports 2 and 3 connected to the conventional pipeline joint (not shown). The casing 1 is provided with the usual valve chamber 4, the central portion thereof having the valve seats 5 and 6 upon which the disc or closure member, generally designated 7, makes suitable contact therewith during the normal closing of the valve as illustrated. The lower end portion of the disc is provided with the passage or ported portion 8, which in the open position of the valve coincides with the ports 2 and 3 of the casing.

At the upper end of the valve casing chamber 4, the bonnet 9 serves as a cover therefor and is held in fluid sealing relation by means of the gasket 11 and bolts (not shown). The threaded stem 12 engages the stem hole bushing 13, the latter member being threadedly received and is held in non-rotatable relation to the bonnet by means of the set-screw 14. Thus, it will be clear that by suitable rotation of the stem 12, the reciprocating movement of the disc or closure member 7 in opening or closing the valve is accomplished.

So far, the description has been concerned with what is considered to be conventional and regular in conduit type gate valves. In the instant structure, however, the conduit closure member 7 consists of two halves designated respectively 15 and 16 as indicated, forming therebetween in juxtaposition a hollow recessed portion in each disc half, as at 17 and 18, for the purpose of receiving the T-head 19 of the stem 12. Immediately below the respective recessed portions 17 and 18 is the lower oppositely disposed relieved sections 21 and 22. A tapered pair of oppositely disposed surfaces, annular in form, are immediately below the chambers 21 and 22, with the diverging tapered plain surfaces designated 23 and 24. The lower ported portion 8 of the closure member 7 is also provided with oppositely tapered spaced-apart annular surfaces, diverging as indicated at 25 and 26, and being also of annular form in relief. Between the respective annular surfaces 23 and 24 and 25 and 26, the wedged member, generally designated 27, is positioned which is inserted therebetween by initial movement sidewise between the disc half members 15 and 16. The general shape and external configuration of the wedge member 27 is shown more clearly in the exterior perspective view of Fig. 3. The manner in which the wedge 27 of Fig. 3 may be slidably positioned sidewise in the initial positioning between the disc halves 15 and 16 is more clearly understood by referring to the perspective view in Fig. 4, wherein, as previously stated, the wedge member 27 has been removed for affording greater clarity in showing the interior of the disc half assembly.

At its lower end portion, the wedge member 27 is provided with a stop 28, preferably adjustable, as indicated, and threadably attached thereto as indicated in Fig. 1. At its upper end portion, as more clearly shown in Fig. 3, a pair of stops are provided for the disc-halves at 29 and 31, the former stop being preferably adjustably mounted and also being removable in order to allow for the inward sidewise insertion, as previously referred to, between the disc halves 15 and 16, the attachment being accomplished by means of the stove-bolts 30 as shown in Fig. 3. It is necessary, of course, to provide for the sidewise insertion referred to between the disc halves, because as more clearly shown in Fig. 1, the disc halves are preferably joined at top and bottom by means of the integral webs 32 and 33 respectively, and there is obviously not sufficient space therebetween. While the respective webs 32 and 33 are preferably made integral, it is, of course, a matter of convenience in manufacture that in some installations it may be desirable as well as more practical to weld the said webs to the respective closure member halves 15 and 16.

The principal object of these webs is to permit of the disc halves to be held normally in relatively closely spaced relationship to each other, and yet, at the same time, to allow for sufficient resilience when being spread under the influence of the wedge member 27 to stretch or give slightly. At the same time, it should also be understood that the webs 32 and 33 are not only flexible but also preferably retain their original conformation and without taking a permanent set or become distorted. The ribs 32 and 33 thereby impart sufficient resiliency to the structure to enable the respective closure members to be drawn together after the normal wedging action produced by the member 27 had ceased. Thus, the wedge member will generally impart a wedging effect to the disc halves at either the upper or lower positions of the valve, that is the opened and closed positions of the valve. This is done by the wedging on the respective inclined surfaces 23 or 24 in the closed position or else at surfaces 25 and 26 in the open position.

It has also been found desirable in order to insure the central positioning of the wedging member 27 with respect to the wedging surfaces above referred to that a resilient or spring-like member 34 (see Fig. 2) be employed which is preferably of narrow thin-stick form and of a length sufficient to fit within the respective slots spanning thereacross, as indicated at 35 and 37, and being centrally supported at slot 38 in the web 39 of the wedge member 27. The resilient bar 34 is preferably made only thick enough to allow for the relatively rigid central positioning of the wedge member, to resist resiliently any movement of the wedge 27 axially from such position and to again draw it to a central position upon the cessation of the wedging action therebetween.

The resilient arrangement above described is preferably provided on each side of the closure members as indicated more clearly in Figs. 2 and 4, the slots 35 and 37 being provided on both sides to keep the resilient stick-like member 34 accurately positioned with respect to the rib 39 of the wedge member 27. For centering, the oppositely disposed pins 41 projecting through the resilient member 34 may be used, as shown. Preferably, a plurality of relatively loosely mounted pins, as at 43, complete the assembly in holding a plate member 42 on each side as indicated more clearly in Fig. 4, the screws 43 retaining said plate in place also hold the member 34 against transverse displacement and loss, the pins 41 retaining it against axial displacement.

It should be clear from what has been described thus for that in actual operation upon movement of the closure member 7 to either end limit of the opening and closing of the valve, the wedge member 27 will move slightly transversely relative thereto and exercise its wedging effect upon the respective surfaces either 23 and 24 or 25 and 26, depending upon whether the valve is being opened or closed. This movement of the spreader 27 will cause the slight expansion outwardly or spread of the closure members 15 and 16 against the restraining effect of the webbed portions 32 and 33 and operatively contact the respective seating surfaces 5 and 6 of the casing 1 in either the open or closed positions of the valve. However, immediately upon such spreading action being withdrawn upon movement of the valve closure 7 in the opposite direction, then the spring member 34 will tend to return to its normally straightened position and thus draw with it the interposed wedge member 27 upwardly or downwardly depending upon the seating contact surfaces position at that stage of valve operation. The wedge member is, of course, assisted in returning to its center or straight position by the return of the upper and lower resilient webs or ties 32 and 33 to their normal unstressed condition. In the latter connection, it should be noted that the lower web 33 may be slotted as at 40 if desired to provide even greater resilience. This construction is a matter of choice, and, therefore, optional.

In the limit of movement of the valve in the valve opening direction, the stops 29 and 31 will bear against the lowermost surface of stem hole bushing 13, the latter member being positioned in the bonnet as previously described. At this position, the port 10 in the wedging member 27 will coincide with the opening 8 of the respective ported disc halves 15 and 16. For lightness in weight and metal saving, the wedging member may also be ported as at 50, but this is not essential to the efficient operation of the device, but merely provides a narrow annular bearing surface for contact with the similarly formed seats 23 and 24 of the disc-half members 15 and 16. Thus, it is clear that an effective and positive resilient wedging means has been provided, and while the description has only been directed to one form of valve, namely, a conduit valve, it should be understood that the principle underlying the invention can also be applied to other forms of valve devices with equal practicability, economy, and convenience.

While only a single embodiment has been shown and described in connection with the structure embodying the invention, it should, of course, be apparent that many other forms may be used within the spirit and scope of this contribution as measured by the appended claims.

I claim:

1. In a limitedly expandable wedge valve, a valve body with inlet and outlet and valve seats therebetween, a closure member having spaced-apart seating members slidably engageable with said valve seats, a relatively movable wedge member therebetween with converging tapered surfaces engaging similar inner surfaces on the said closure member, a stem connected to said closure member, integral deformable resilient means on the said seating member cooperating with said wedge member for drawing the said seating members together upon return of the said resilient means to substantially original configuration during predetermined axial movement of the said closure member and stem, the said resilient limiting means spanning the said space between seating members and being connected to the said seating members adjacent the stem connection with the seating members at an upper end portion thereof and being integrally connected to said seating members at a lower end portion thereof and elongated flexible means snugly mounted in a horizontal plane on either side of said wedge member engaging at end limits thereof the said seating members of said closure member in planes adjacent the valve seats.

2. In an expandable wedge gate valve construction, the combination comprising a valve body with inlet and outlet and valve seats therebetween, a closure member having divided seating portions slidably engaging said valve seats, a relatively movable wedging member with inclined surfaces between the divided portions of the said closure member, the said divided portions having oppositely disposed inner surface means for cooperation with said wedging member to initiate wedging action of the latter member, said latter means including resilient and limitedly deformable web means on upper and lower end limits of the divided seating portions for spanning and drawing said divided portions together upon return of said web means to their original configuration and upon cessation of the wedging member to function, stick-like resilient means in axial alignment with the inlet and outlet and engaging side portions of the closure and wedge members, and stop means on the said wedging member projecting between said web means for limiting the movement of said closure member in the valve opening and closing directions.

3. In an expandable wedge gate valve construction, the combination comprising of a casing with valve seats and an inlet and outlet, a closure member therefor engaging said valve seats and having divided seating portions with converging and diverging oppositely disposed inner surfaces, a relatively movable wedging member having inclined mating surfaces interposed between the divided portions of the said closure member to predeterminately engage and disengage said converging and diverging surfaces, the said divided portions having integral resilient web connecting means thereon of V-configuration and extending in a plurality of planes beyond opposite end portions thereof for cooperation with said wedging member to permit limited expandibility of said divided seating portions, said latter web connecting means being deformable and normally drawing said divided portions together upon cessation of the wedging member to function and upon return of said deformable web means to original unstressed configuration, the said casing having means for limiting the closing movement of said closure member, said limiting means within the casing predeterminately abutting said wedging member between said web connecting means and being effecting concurrently with the web connecting means to allow for said limited expandibility of said divided seating portions of said closure member in the valve closed position upon predetermined axial movement of said wedging member relative to the dividing seating portions, and elongated resilient biasing means between the said wedging member and divided seating portions mounted on complementary recessed median portions of the said latter members.

4. In an expandible wedge conduit gate valve construction, the combination comprising a ported body member and having oppositely disposed parallel seats slidingly engageable by a ported closure member having spaced-apart seating members with oppositely disposed inner tapered surfaces, one pair of said latter surfaces being ported, a ported wedging member between the seating members predeterminately movable axially relative to said seating members and engaging the oppositely disposed inner tapered surfaces in maximum limits of movement in opening and closing the valve, web connecting means projecting beyond upper and lower limits of said closure member integral with said seat members and limitedly resilient and deformable to permit expanding of said seating members upon predetermined engagement of said wedge member with said seating members, said resilient means drawing said seating members together upon return of said resilient means to their original configuration after said limited deformation, and resilient bendable rod means on either side of the said closure member and wedging member received exteriorly thereof extending in a common horizontal plane to engage said latter members for holding ports of said wedging member and said closure member in substantial axial alignment upon wedging effort being withdrawn.

5. In a limitedly expandible conduit wedge valve, the combination of a valve body with an inlet and outlet and parallel seats therebetween, a ported closure member having spaced-apart seating members slidingly engaging the said seats, a relatively movable wedge member therebetween having upper and lower ported portions, a stem connected to said closure member, resilient web means slightly movable and integral with the closure member to join the seating members and cooperating with said wedge member for drawing the said seating members together during predetermined movement of the said wedge member relative to the said closure member and return of the said resilient web means to their original configuration, the said web resilient means being connected to the said seating members to span the closure member transverse to the seating members at upper and lower limits of the said closure member beyond the ported portions of the said wedge and closure member and a resilient bendable rod joining said seating members and wedge member with means within the body for holding the rod against substantial sidewise and endwise movements.

6. In an expandible wedge conduit gate valve construction, the combination comprising a valve body with inlet and outlet and valve seats therebetween and a ported closure member having divided seating portions engaging said seats, a relatively movable ported wedging member with outer inclined surfaces snugly fitted between the divided portions of the said closure member, a stem loosely connected to oppositely disposed inner recesses on the divided seating portions of the said closure member, each of the said divided seating portions having at opposite end limits thereof oppositely disposed integral resilient spanning means between the divided portions above and below the wedge member for normally drawing said divided portions together upon cessation of the said wedging member to function and upon return of the resilient deformable spanning means to an original configuration, resilient elongated means for effecting alignment of ports of said closure and wedge members, the said closure member and wedging member having complementary recesses for snugly receiving spaced apart areas of said alignment effecting means.

References Cited in the file of this patent

UNITED STATES PATENTS

| 476,668 | Miller | June 7, 1892 |
| 868,165 | Doolittle | Oct. 15, 1907 |
| 1,783,329 | Edmonds | Dec. 2, 1930 |
| 1,786,295 | Ericsson | Dec. 23, 1930 |
| 1,886,139 | Wells | Nov. 1, 1932 |
| 2,192,331 | Schaefer | Mar. 5, 1940 |
| 2,195,923 | Hehemann | Apr. 2, 1940 |
| 2,196,794 | Hall | Apr. 9, 1940 |
| 2,210,189 | Sorenson | Aug. 6, 1940 |
| 2,406,099 | Penick | Aug. 20, 1946 |
| 2,479,124 | Laurent | Aug. 16, 1949 |

FOREIGN PATENTS

| 2,769 | Great Britain | 1884 |